(12) United States Patent
Phan et al.

(10) Patent No.: US 9,720,390 B2
(45) Date of Patent: Aug. 1, 2017

(54) REDUCING CORRECTIVE ACTIONS IN SECURITY-CONSTRAINED OPTIMAL POWER FLOW VIA SPARSITY REGULARIZATION

(71) Applicant: Utopus Insights, Inc., Vahalla, NY (US)

(72) Inventors: Dung Phan, Ossining, NY (US); Xu Sun, Atlanta, GA (US)

(73) Assignee: Utopus Insights, Inc., Valhalla, NY (US)

( * ) Notice: Subject to any disclaimer, the term of this patent is extended or adjusted under 35 U.S.C. 154(b) by 307 days.

(21) Appl. No.: 14/318,660

(22) Filed: Jun. 29, 2014

(65) Prior Publication Data

US 2015/0378384 A1    Dec. 31, 2015

(51) Int. Cl.
*G05B 15/02* (2006.01)
*H02J 3/00* (2006.01)

(52) U.S. Cl.
CPC ............... *G05B 15/02* (2013.01); *H02J 3/00* (2013.01); *H02J 2003/001* (2013.01)

(58) Field of Classification Search
None
See application file for complete search history.

(56) References Cited

U.S. PATENT DOCUMENTS

| | | | |
|---|---|---|---|
| 6,775,597 B1 * | 8/2004 | Ristanovic | G06Q 10/06 700/293 |
| 7,321,810 B2 | 1/2008 | Mansingh et al. | |
| 7,349,887 B2 | 3/2008 | Peljto | |
| 7,668,707 B2 * | 2/2010 | Watts, III | G06Q 50/06 703/10 |
| 7,752,150 B2 | 7/2010 | Ye et al. | |
| 8,126,685 B2 | 2/2012 | Nasle | |
| 8,295,953 B2 | 10/2012 | Piche | |
| 8,648,499 B2 * | 2/2014 | Krok | H02J 3/18 307/103 |
| 8,775,136 B2 * | 7/2014 | Akrotirianakis | G06F 17/11 703/2 |
| 8,816,531 B2 * | 8/2014 | Krok | H02J 3/1807 307/31 |
| 8,977,524 B2 * | 3/2015 | Legbedji | G06Q 10/04 703/2 |
| 9,093,842 B2 * | 7/2015 | Raghunathan | H02J 3/00 |
| 2004/0162792 A1 | 8/2004 | Satou et al. | |

(Continued)

OTHER PUBLICATIONS

Monticelli et al., "Security-Constrained Optimal Power Flow with Post-contingency Corrective Rescheduling", Feb. 1987, IEEE Transactions on Power Systems, vol. PWRS-2, No. 1, pp. 175-180.*

(Continued)

*Primary Examiner* — Jason Lin

(57) ABSTRACT

A method for determining a generation schedule with contingency constraints for controlling power output levels for a plurality of generators in an electric power system including determining a measure of a sparse, corrective model (C), security-constrained optimal power flow (SCOPF), which reduces a number of post-contingency rescheduling operations for each of a plurality of contingencies, and adjusting a power output level of at least one of the plurality of generators according to the measure of the sparse C-SCOPF upon detecting a contingency in the electric power system.

19 Claims, 5 Drawing Sheets

(56) References Cited

U.S. PATENT DOCUMENTS

| | | |
|---|---|---|
| 2012/0185106 A1 | 7/2012 | Ghosh et al. |
| 2013/0018517 A1 | 1/2013 | Kalagnanam et al. |
| 2015/0199606 A1* | 7/2015 | Raghunathan ........... G06N 5/04 706/53 |

OTHER PUBLICATIONS

Dai et al., "Long-term benefits of online risk-based direct-current optimal power flow", Dec. 1, 2011, Proc. IMechE, vol. 226 part O: J. Risk and Reliability, pp. 65-74.*

Li et al., "A Reliability Based Approach to Transmission Maintenance Planning and Its Application in BC Hydro system", 2001, IEEE, vol. 0-7803-7173-9/01, pp. 510-515.*

Kim et al.; Ttl: Security constrained optimal power flow by hybrid algorithms; Journal Ttl: Transactions of the Korean Institute of Electrical Engineers, A, vol. 49, No. 6, pp. 305-311; Jun. 2000; Publisher: Korean inst. Electr. Eng.; Country of Publication: South Korea; ISSN:1229-2443; Database: INSPEC.

* cited by examiner

FIG. 1

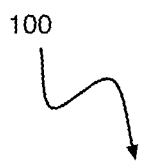

---

Algorithm 1 ADMM for sparse C-SCOPF

1: Initialization: $t = 1$
2: repeat
3:    for $c \in \{0, 1, \ldots, C\}$ do
4:       if $c = 0$ then
5:          Solve (6) for $\alpha = \sum_{c \in C} \lambda_t^c$ and $\beta^c = p_t^{0,c}$
6:          Denote the optimal solution as $(p_{t+1}^0, \theta_{t+1}^0)$
7:       else
8:          Solve (7) for $\alpha = \lambda_t^c$ and $\beta = p_{t+1}^0$
9:          Denote optimal solution as $(p^c, \theta^c, p^{0,c}, w^c)_{t+1}$
10:         Update multipliers:
$$\lambda_{t+1}^c = \lambda_t^c + \gamma \left( p_{t+1}^{0,c} - p_{t+1}^0 \right)$$
11:       end if
12:    end for
13:    $t \leftarrow t + 1$
14: until a stopping criterion is met.

FIG. 2

200

---

Algorithm 2 Accelerated ADMM for sparse C-SCOPF

1: Initialization: $t = 1$
2: repeat
3:    for $c \in \{0, 1, \ldots, C\}$ do
4:       if $c = 0$ then
5:          Solve (6) for $\alpha = \sum_{c \in C} \hat{\lambda}_t^c$ and $\beta^c = \hat{p}_t^{0,c}$
6:          Denote the optimal solution as $(p_{t+1}^0, \theta_{t+1}^0)$
7:       else
8:          Solve (7) for $\alpha = \hat{\lambda}_t^c$ and $\beta = p_{t+1}^0$
9:          Denote the optimal solution $(p^c, \theta^c, p^{0,c}, w^c)_{t+1}$
10:         Update multipliers:
$$\lambda_{t+1}^c = \hat{\lambda}_t^c + \gamma \left( p_{t+1}^{0,c} - p_{t+1}^0 \right)$$
11:       Acceleration step:
12:       if $\max(d_t, r_t) - \max(d_{t+1}, r_{t+1}) > 0$ then
13:          Update:
$$a_{t+1} = \frac{1 + \sqrt{1 + 4a_t^2}}{2}$$
$$\hat{p}_{t+1}^{0,c} = p_{t+1}^{0,c} + \frac{a_t - 1}{a_{t+1}} \left( p_{t+1}^{0,c} - p_t^{0,c} \right)$$
$$\hat{\lambda}_{t+1}^c = \lambda_{t+1}^c + \frac{a_t - 1}{a_{t+1}} \left( \lambda_{t+1}^c - \lambda_t^c \right)$$
14:       else
15:          Update:
$$a_{t+1} = 1, \hat{p}_{t+1}^{0,c} = p_{t+1}^{0,c}, \hat{\lambda}_{t+1}^c = \lambda_{t+1}^c$$
16:       end if
17:     end if
18:    end for
19:    $t \leftarrow t + 1$
20: until a stopping criterion is met.

REDUCING CORRECTIVE ACTIONS IN SECURITY-CONSTRAINED OPTIMAL POWER FLOW VIA SPARSITY REGULARIZATION

BACKGROUND

The present disclosure relates to methods for determining power output levels of generators in an electric power system.

Control of electric power grids (e.g., in dispatching energy) is becoming more important to the generation of electricity. For example, centralized optimal power flow (OPF) algorithms have been implemented for parallelization of certain computation steps, market coordination, convex relaxation formulation of OPF and decentralization to cliques, and linearized approximation of OPF and decentralization to sub-systems.

Contingency analysis is routinely performed in the operation of these electric power grids. One goal is to ensure that the grid remains balanced and reliable in both normal state and contingencies when any one or more components, such as generators, transmission lines, transformers, or other equipment, experience unexpected failure. The OPF problem with contingency constraints considering the failure of one component at a time is often referred to as the N−1 security-constrained optimal power flow (SCOPF).

BRIEF SUMMARY

According to an exemplary embodiment of the present invention, a method for determining a generation schedule with contingency constraints for controlling power output levels for a plurality of generators in an electric power system including determining a measure of a sparse, corrective model (C), security-constrained optimal power flow (SCOPF), which reduces a number of post-contingency rescheduling operations for each of a plurality of contingencies, and adjusting a power output level of at least one of the plurality of generators according to the measure of the sparse C-SCOPF upon detecting a contingency in the electric power system.

BRIEF DESCRIPTION OF THE SEVERAL VIEWS OF THE DRAWINGS

Preferred embodiments of the present invention will be described below in more detail, with reference to the accompanying drawings:

FIG. 1 shows an algorithm applying ADMM (Alternating Direction Multiplier Method) to solve a sparse C-SCOPF according to an exemplary embodiment of the present invention;

FIG. 2 shows an accelerated ADMM algorithm for the SCOPF according to an exemplary embodiment of the present invention;

DETAILED DESCRIPTION

Figure 3:
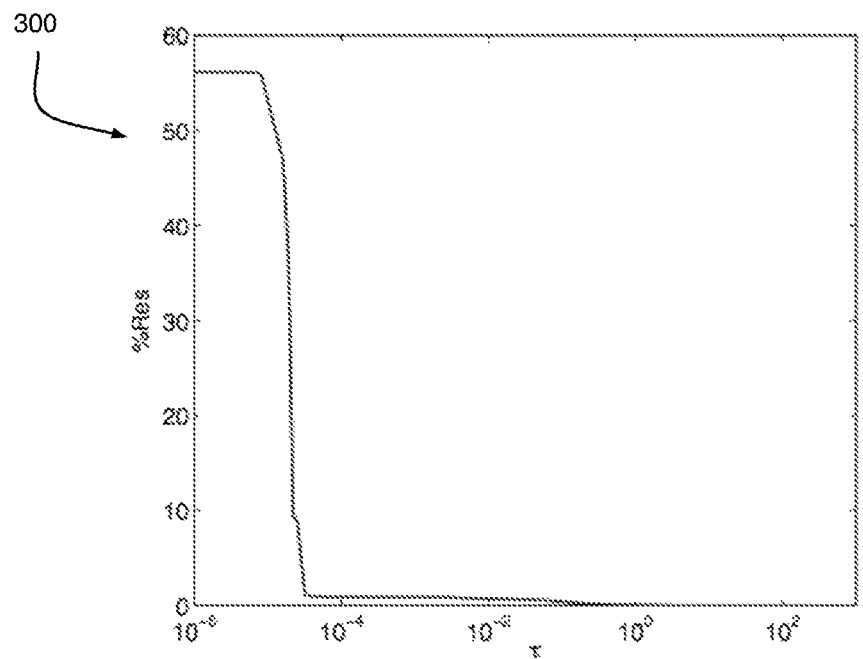
FIG. 3 shows an average percentage of generation rescheduling ("% Res") in a sparse C-SCOPF model as a function of a regularization parameter $\tau$ according to an exemplary embodiment of the present invention.

According to an exemplary embodiment of the present invention, a system and method are configured for corrective security-constrained optimal power flow (SCOPF) with DC (direct current) power flow constraints. A system operator determines a generation schedule according to a corrective SCOPF (C-SCOPF) for an electric power grid that reduces a number of post-contingency corrections and reduces an amount of total power (e.g., measured in megawatts (MW)) rescheduled in the case of a contingency (e.g., failure of a component of the electric power grid such as a transmission line). A C-SCOPF model, according to an embodiment of the present invention, is configured to clear contingencies with corrective actions that have a low impact on grid operations. Further, the C-SCOPF model utilizes sparse optimization techniques to achieve computational tractability for large-scale power systems.

The SCOPF model is computationally efficient (e.g., without involving integer decision variables), easy to decompose (e.g., viable for parallel or distributed computation), and situation independent in the sense that a C-SCOPF model lets the optimization itself determine a number of post-contingency actions based on the system operating conditions when the contingency occurs, rather than pre-specify a fixed number.

According to an exemplary embodiment of the present invention, the number of post-contingency rescheduling for contingency c is the same as the number of non-zero entries in the vector $(u_c - u_0)$. A vector with few non-zero entries (e.g., less than about 10% of the entries) is called a sparse vector. The task of finding a generation schedule with few post-contingency rescheduling is equivalent to finding $(u_0, u_c, \forall c)$ such that the resulting $(u_c - u_0)$ is a sparse vector for each $c \in C$. Such sparse solutions can be induced by techniques from sparse optimization.

According to an exemplary embodiment of the present invention, a sparse DC-based C-SCOPF model is written as:

$$\min_{p^c, \theta^c, \forall c \in \{0\} \cup C} f(p^0) + \tau \sum_{c \in C} \|p^c - p^0\|_1 \qquad (1a)$$

$$\text{s.t. } F^c(p^c, \theta^c) \leq 0, \forall c \in \overline{C} \qquad (1b)$$

$$\underline{p} \leq p^c \leq \overline{p}, \forall c \in \overline{C} \qquad (1c)$$

$$\underline{\theta} \leq \theta^c \leq \overline{\theta}, \forall c \in \overline{C} \qquad (1d)$$

$$|p^c - p^0| \leq \Delta p, \forall c \in C, \qquad (1e)$$

where the decision variables are production levels of generating units $p^0$ and bus voltage angles $\theta^0$ for the normal state, and $p^c, \theta^c$ for each contingency c in the contingency index set C. The formulation (1a-1e) achieves a significant reduction in the number of post-contingency actions.

According to an exemplary embodiment of the present invention, a sparse AC (alternating current) based C-SCOPF model is written as:

$$\min_{p^c,q^c,v^c,\theta^c,\forall c\in\{0\}\cup C} f(p^0) + \tau\sum_{c\in C} \|p^c - p^0\|_1 \quad (1f)$$

$$s.t.\ F^c(p^c,q^c,v^c,\theta^c)\leq 0, \forall c\in \overline{C} \quad (1g)$$

$$\underline{p}\leq p^c \leq \overline{p}, \forall c\in \overline{C} \quad (1h)$$

$$\underline{q}\leq q^c \leq \overline{q}, \forall c\in \overline{C} \quad (1k)$$

$$\underline{\theta}\leq \theta^c \leq \overline{\theta}, \forall c\in \overline{C} \quad (1l)$$

$$\underline{v}\leq v^c \leq \overline{v}, \forall c\in \overline{C} \quad (1m)$$

$$|q^c - q^0| \leq M \cdot |p^c - p^0|, \forall c \in C, \quad (1n)$$

$$|p^c - p^0| \leq \Delta p, \forall c \in C, \quad (1o)$$

where $q^c$ is the reactive power, $v^c$ is the voltage magnitude, and M is the big-M parameter. Constraint (1n) means that if the active power $p^c$ is not rescheduled, then the reactive power $q^c$ remains unchanged. The formulation (1f-1o) achieves a reduction in the number of post-contingency actions.

The objective functions (1a) and (1f) include the term $$\tau \sum_{c\in C} \|p^c - p^0\|_1$$

with $\tau > 0$. This term is called $l_1$-regularization, which induces sparsity in $(p^c - p^0)$. In particular, for any vector $x \in R^n$, the number of nonzero entries in x can be counted by computing the $l_0$-norm $\|x\|_0$. To find a vector x with the least number of nonzero entries is the same as minimizing the $l_0$-norm $\|x\|_0$ in the optimization problem. Due to its combinatorial nature, the $l_0$-norm $\|x\|_0$ is a non-convex function of x, and directly minimizing $\|x\|_0$ is a NP-hard problem. It can be reformulated by introducing integer variables, which lead to a mixed-integer program (MIP). To avoid the computational burden of solving MIPs, $\|x\|_0$ can be approximated by a convex function. A tight convex approximation to $\|x\|_0$ on the hypercube $[-1,1]^n$ can be expressed as the $l_1$-norm $\|x\|_1 = \Sigma_i |x_i|$. Minimizing the $l_1$-norm is an efficient approximation to minimizing the number of nonzero entries in the solution. The penalty term $\Sigma_c \|p^c - p^0\|_1$ minimizes the number of changes and minimizes the absolute value of total MW shifted between the base case and contingency solutions.

According to an exemplary embodiment of the present invention, the constraints (1b-1e) in a DC-based C-SCOPF model include: (1b) the power flow balance and flow limit constraints for the transmission network in contingency c when the c-th transmission line is outed (equalities can be expressed by two opposing inequalities); (1c) and (1d) bounding constraints for the generators' output levels and the bus voltage angles, respectively; (1e) a constraint on the difference between the normal state and post-contingency generation levels, where $\Delta p$ depends on the generators' ramping capabilities.

Note that the models (1a-1e) and (1f-1o) are a non-differentiable optimization problems due to the $l_1$-norm term. Both sparse C-SCOPF models can be reformulated as a differentiable optimization problem by using variables $w_i^c$:

$$\min f(p^0) + \tau \sum_{i\in G, c\in C} w_i^c \quad (2a)$$

$$s.t.\ (p^c, \theta^c) \in F_c \forall c\in C \quad (2b)$$

$$-\Delta p \leq p^c - p^0 \leq \Delta p \forall c\in C \quad (2c)$$

$$-w^c \leq p^c - p^0 \leq w^c \forall c\in C, \quad (2d)$$

where $F_c$ is a feasible region defined by (1b-1d) or (1g-1n), and in the objective functions (2a) and (1f), the $l_1$-norm penalty $\Sigma_{c\in C} \|p^c - p^0\|_1$ is replaced with a linear term $\Sigma_{i,c} w_i^c$ and reformulated in constraint (2d). For the AC model, (2b) is expressed as $(p^c, q^c, v^c, \theta^c) \in F_c$. For simplicity, algorithms are presented for the DC model; however, one of ordinary skill in the art would recognize that the algorithms are applicable to the AC model.

A C-SCOPF model according to an embodiment of the present invention introduces an auxiliary variable $p^{0,c}$ and imposes a constraint $$p^{0,c} = p^0$$

for each contingency $c \in C$. Since the objective function has the term $\Sigma_{i,c} w_i^c$, at an optimum, there must hold $w^c = |p^c - p^0|$. Further, the constraints $-\Delta p \leq p^c - p^0 \leq \Delta p$ are removed and an upper bound $w^c \leq \Delta p$ is added. In this way, the number of constraints is reduced. The following reformulation results:

$$(P) \min f(p^0) + \tau \sum_{i\in G, c\in C} w_i^c \quad (3a)$$

$$s.t.\ (p^c, \theta^c) \in F_c \forall c \in \overline{C} \quad (3b)$$

$$-w^c \leq p^c - p^{0,c} \leq w^c \forall c\in C \quad (3c)$$

$$w^c \leq \Delta p\ \forall c \in C \quad (3d)$$

$$p^{0,c} - p^0 = 0 \forall c \in C, \quad (3e)$$

to which an ADMM-based decomposition can be applied.

Embodiments of the present invention are applicable to AC. For example, to ensure AC feasibility, a DC SCOPF model can be coupled with an AC feasibility check module in an iterative manner.

Referring now to a decomposition with ADMM, problem ((P) 3a-3e) is a large-scale optimization problem. Inspecting the structure of the formulation reveals that the constraints are almost separable into contingencies, except for constraint (3e), which couples the feasible sets of different contingencies. This coupling can be separated by penalizing constraint (3e) and forming the augmented Lagrangian of (3a-3e):

$$L_\gamma = f(p^0) + \tau\sum_{i\in G, c\in C} w_i^c + \sum_{c\in C}(\lambda^c)^T(p^{0,c}-p^0) + \frac{\gamma}{2}\sum_{c\in C}\|p^{0,c}-p^0\|^2 \quad (4)$$

where $\gamma > 0$ is a penalty parameter. The primal variables $x = (p^0, \theta^0)$ and $z = (z^c, \forall c \in C)$, can be defined where $z^c = (p^c, \theta^c, p^{0,c}, w^c)$, and the dual variable $\lambda = (\lambda^c, \forall c \in C)$.

An exemplary embodiment of ADMM for solving (P) (see (3a)) has the following form:

$$x_{t+1} = \operatorname*{argmin}_{x \in X} L_\gamma(x, z_t, \lambda_t) \qquad (5a)$$

$$z_{t+1} = \operatorname*{argmin}_{z \in Z} L_\gamma(x_{t+1}, z, \lambda_t) \qquad (5b)$$

$$\lambda_{t+1} = \lambda_t + \gamma(Ax_{t+1} + Bz_{t+1} - h), \qquad (5c)$$

where $X = F_0$, the set $Z$ is the feasible region defined by constraints (3b-3d), and $Ax+Bz=h$ represents the coupling constraint (3e).

To facilitate the presentation, define the following two optimization problems $$\min_{(p^0,\theta^0)\in\mathcal{F}_0} f(p^0) - (p^0)^T\alpha + \frac{\gamma}{2}\sum_{c\in C}\|p^0 - \beta^c\|^2 \qquad (6)$$

and $$\min_{p^c,\theta^c,p^{0,c},w^c} \tau e^T w^c + \alpha^T(p^{0,c} - \beta) + \frac{\gamma}{2}\|p^{0,c} - \beta\|^2 \qquad (7)$$

$$\text{s.t. } (p^c, \theta^c) \in \mathcal{F}_c$$
$$-w^c \le p^c - p^{0,c} \le w^c$$
$$w^c \le \Delta p,$$

where the parameters $\alpha$, $\beta^c$, and $\beta$ are specified.

Algorithm 1 in FIG. 1 applies the ADMM (5) to solve the sparse C-SCOPF (3). For $c=1, 2, \ldots, C$, the subproblems (7) for C contingencies can be solved in parallel. Note that the multipliers at Line 10 are Lagrangian multipliers.

The following shows the convergence of Algorithm 1 (100, FIG. 1).

Assume that $f(p^0)$ is closed, proper, and convex, and $\bar{p}$ is bounded. The ADMM iterates in Algorithm 1 satisfy that as $t \to \infty$, the following hold for the DC model
1) $p_t^{0,c} - p_t^0 \to 0$ for each $c \in C$;
2) the objective function value $f(p_t^0) + \tau\Sigma_{i\in G, c\in C}(w_i^c)_t$ converges to the optimal value;
3) the dual variable $\lambda_t^c$ converges to dual optimal solution.

It suffices to verify that the Lagrangian $L_0$ defined in (4) with $\gamma=0$ has a saddle point. Then, the convergence theorem of ADMM can be invoked. Equivalently, it suffices to show that the strong duality holds between the primal problem (3a-e) and the following dual problem:

$$\max_\lambda \min_{x,z} L_0(x, z, \lambda) \qquad (8)$$
$$\text{s.t.}(3b), (3c), (3d)$$

which in term is a generalized dual of (P), where only constraint (3e) is dualized. The theory of generalized duality for linear programs guarantees the strong duality property if both (P) and (8) are both feasible, which holds for exemplary embodiments of the present invention.

ADMM can be accelerated similar to traditional gradient descent algorithms for solving convex optimization problems. According to an exemplary embodiment of the present invention, an accelerated ADMM algorithm (Algorithm 2) for the SCOPF (200, FIG. 2) includes an acceleration step in Lines 12-16 and sequences $\hat{p}_{t+1}^{0,c}$ and $\hat{\lambda}_{t+1}^c$. In particular, the acceleration step is carried out when the largest residual $(\max(d_{t-1}, r_{t-1}) - \max(d_t, r_t) > 0)$ has been reduced, where $d_t$, $r_t$ are defined as:

$$r_t = \max_c \|p_t^{0,c} - p_t^0\|_\infty$$

$$d_t = \max_c(\|p_t^c - p_{t-1}^c\|_\infty, \|\theta_t^c - \theta_{t-1}^c\|_\infty, \|p_t^{0,c} - p_{t-1}^{0,c}\|_\infty, \|w_t^c - w_{t-1}^c\|_\infty).$$

Algorithm 2 can accelerate the ADMM of Algorithm 1 to obtain an improved convergence rate for a first-order method under favorable conditions. For example, when the objective function is strongly convex, Algorithm 2 achieves an $\epsilon$-optimal solution within $O(1/\sqrt{\epsilon})$ iterations, whereas Algorithm 1 needs $O(1/\epsilon)$ iterations. The objective function being strongly convex is used in order to establish this theoretical convergence rate. For the sparse C-SCOPF model (4), the objective function is not strongly convex.

Algorithm 1 facilities the understanding of the acceleration. More importantly, it has a robust convergence, e.g., the convergence analysis establishes its convergence under general conditions. A closer study in the computation performance also shows that the efficiency of Algorithm 2 benefits from a dedicated algorithmic setup. For example, warm-start is more useful in connection with Algorithm 2. This can be partially explained by the fact that the acceleration step (Lines 12-16) in Algorithm 2 causes jumps in the parameters, which makes subproblems more difficult to solve starting from the solution of the previous iteration.

An exemplary warm-start strategy uses other contingency's solution within the same iteration to speed up the subproblems of Algorithm 2. One strategy of using the previous iteration's solution as the starting point is not effective in some cases, due to the acceleration steps that introduce jumps in the parameters $\hat{\lambda}$. To overcome this issue, a solution of another contingency is used in the same iteration $t$ as the warm-start for a given contingency. More particularly, the previous step's solution strategy is used for solving a few contingencies to predict the jump. If a significant increase in running time is observed, this warm-start technique can be used. The simple strategy proves to be effective in speeding up the subproblems. It is important to point out that the subproblems for all contingencies in the ADMM-based algorithms can be fully parallelized.

Herein, a model is described for the security-constrained optimal power flow problem with DC power flow constraints, which produces a generation schedule with few post-contingency corrections and a small amount of total MW rescheduled in the case of a contingency. In other words, a SCOPF model according to an embodiment of the present invention effectively clears contingencies with corrective actions that have a small impact on system operations. To achieve this, a $l_1$-regularization technique is used in the corrective SCOPF model.

Selection of the regularization parameter $r$ value is a non-trivial task in the sparse C-SCOPF model (1). In general, higher values of $r$ increase the weight of the $l_1$-regularization term in (1a), therefore, increase the sparsification effect.

In an exemplary PL2383 system (used to illustrate the impact of $\tau$ on the sparsity of the solution, the operational cost, and the computation time), FIG. 3 is a plot 300 of an average percentage of generation re-scheduling ("% Res") in the sparse C-SCOPF model as a function of $\tau$. There is a "phase-transition" type behavior in FIG. 3, for all values of $\tau \ge 3.2 \times 10^{-5}$, the sparse model produces consistently low number of re-scheduling around 1% or lower.

Figure 4:
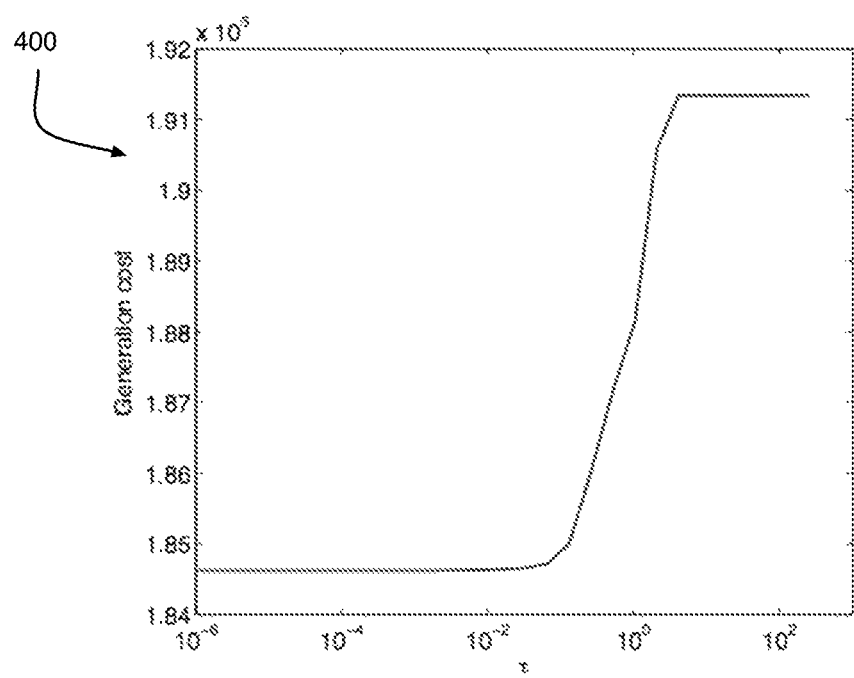
FIG. 4 shows the plot of operational cost versus the regularization parameter $\tau$ according to an exemplary embodiment of the present invention.

FIG. 4 shows a plot 400 of operational cost versus $\tau$. The operational cost of the sparse C-SCOPF model is similar to that of the traditional C-SCOPF for all values of $\tau \le 0.065$, and then increases to the level of the P-SCOPF model for all $\tau \geq 2.0$. Therefore, there is a range of $\tau \in [32 \times 10^5, 0.065]$, where the sparse C-SCOPF model generates a pre-contingency plan that needs few post-contingency actions and at the same time keeps a similar cost level as the traditional corrective model.

Figure 5:
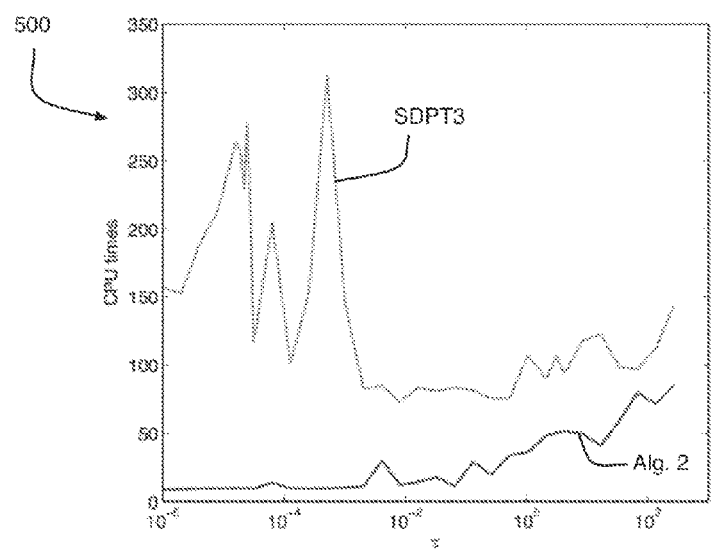
FIG. 5 shows the CPU times in seconds of the interior-point solver and the ADMM Algorithm 2 according to an exemplary embodiment of the present invention.

FIG. 5 shows a plot 500 of CPU times in seconds of the interior-point solver and the ADMM Algorithm 2. The running times for the accelerated ADMM remain almost constant in the range of $\tau \leq 10^{-1}$ and then moderately increase as $\tau$ becomes larger, but remains smaller than the interior-point solver.

According to one or more exemplary embodiment of the present invention, ADMM-based parallelizable algorithms are described, along with warm-start techniques for solving the model.

It should be understood that the methodologies of embodiments of the invention may be particularly well-suited for determining power output levels of generators in an electric power system.

In one exemplary implementation, a failure of a transmission line is considered. In the example, every active generator is able to adjust up to 10% of its maximum power output capacity for the post-contingency actions. The number of contingency scenarios in each system is presented in the fifth column of Table I, and '#Var' is the number of decision variables in the sparse C-SCOPF model.

TABLE I. Description of test power systems. |N| is the number of buses; |G| is the number of generators; |B| is the number of branches; |C| is the number of contingencies; and #Var is the number of variables in the proposed formulation (1a-1e).

| Case | |N| | |G| | |B| | |C| | #Var |
|---|---|---|---|---|---|
| NE39 | 39 | 10 | 46 | 30 | 2728 |
| IEEE118 | 118 | 54 | 186 | 130 | 37990 |
| IEEE300 | 300 | 69 | 411 | 120 | 80949 |
| PL2383 | 2383 | 320 | 3572 | 120 | 615406 |
| PL3012 | 3012 | 293 | 3572 | 150 | 953867 |

Selecting $\tau = 10^{-3}\sqrt{|G|}, \gamma = 1$ and use the following stopping conditions based on the decrease of the primal and dual residuals:

$$r_t \leq \epsilon^{abs}\sqrt{|\mathcal{N}||C|} + \epsilon^{rel}\max\left(\sqrt{\sum_{c \in C}\|(p^{0,c})_t\|^2}, \sqrt{|C|}\|(p^0)_t\|\right)$$

$$d_t \leq \epsilon^{abs}\sqrt{2|\mathcal{N}|} + \epsilon^{rel}\sqrt{\sum_{c \in C}\|(\lambda^c)_t\|^2},$$

where $\epsilon^{abs} = 10^{-4}$, $\epsilon^{rel} = 10^{-3}$. A generator i is rescheduled for contingency $c \in C$ if generator i's post-contingency output is sufficiently different from its pre-contingency level, e.g., $|p_i^c - p_i^0| > 10^{-3}$.

Figure 6:
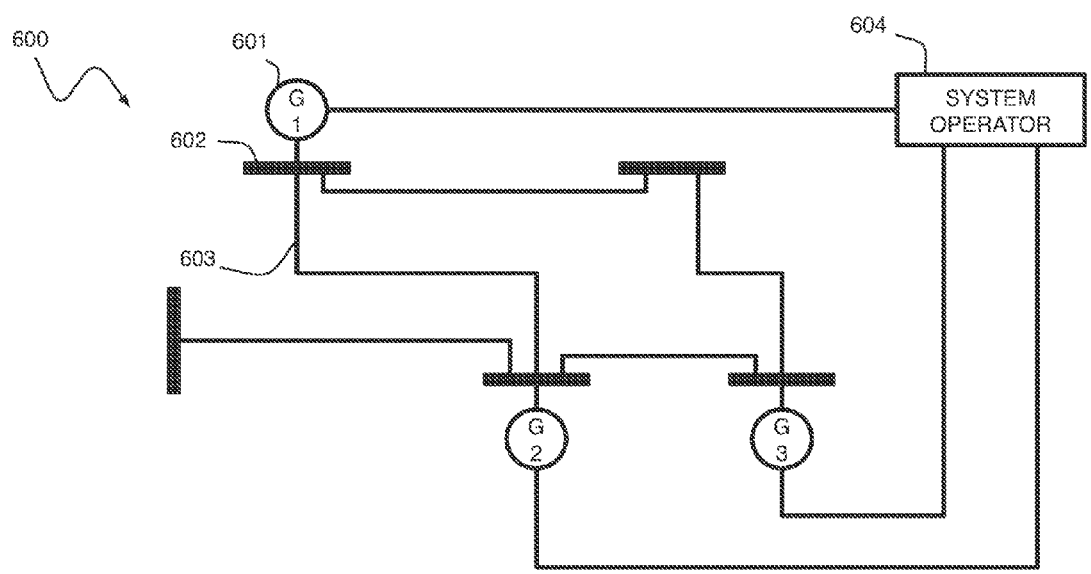
FIG. 6 is a diagram of an electric power system according to an exemplary embodiment of the present invention.

Embodiments of the present invention can be implementing in a variety of networks. FIG. 6 is an exemplary network 600 including a plurality of generators G1-G3, e.g., 601, buses, e.g., 602, branches or transmission lines, e.g., 603, and a system operator 604 configured to determine a generation schedule with contingency constraints for controlling power output levels for the plurality of generators G1-G3. It should be understood that such a system operator 604 can be disposed in a variety of network architectures.

By way of recapitulation, according to an exemplary embodiment of the present invention, a method for determining a generation schedule with contingency constraints for controlling power output levels for a plurality of generators in an electric power system including determining a measure of a sparse C-SCOPF, which reduces (e.g., minimizes based on one or more constraints) a number of post-contingency rescheduling operations for each of a plurality of contingencies, and adjusting a power output level of at least one of the plurality of generators according to the measure of the sparse C-SCOPF upon detecting a contingency in the electric power system.

The methodologies of embodiments of the disclosure may be particularly well-suited for use in an electronic device or alternative system. Accordingly, embodiments of the present invention may take the form of an entirely hardware embodiment or an embodiment combining software and hardware aspects that may all generally be referred to herein as a "processor," "circuit," "module" or "system."

Furthermore, it should be noted that any of the methods described herein can include an additional step of providing a system for determining a generation schedule with contingency constraints for controlling power output levels for a plurality of generators in an electric power system. Further, a computer program product can include a tangible computer-readable recordable storage medium with code adapted to be executed to carry out one or more method steps described herein, including the provision of the system with the distinct software modules.

Figure 7:
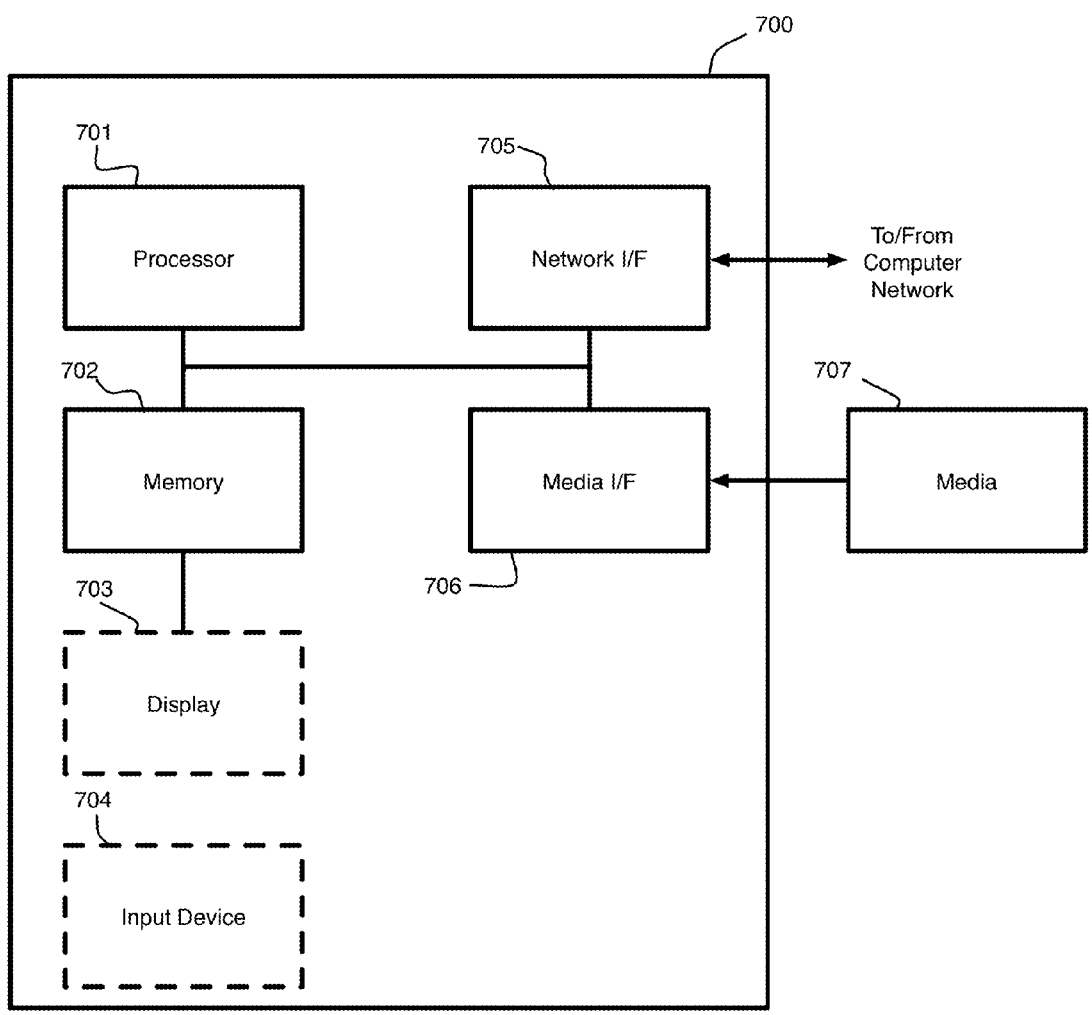
FIG. 7 is a diagram of a computer system configured for indexing video for determining power output levels of generators in an electric power system according to an exemplary embodiment of the present invention.

Referring to FIG. 7; FIG. 7 is a block diagram depicting an exemplary computer system 700 for determining a generation schedule with contingency constraints for controlling power output levels for a plurality of generators in an electric power system according to an embodiment of the present invention. The computer system shown in FIG. 7 includes a processor 701, memory 702, display 703, input device 704 (e.g., keyboard), a network interface (I/F) 705, a media IF 706, and media 707, such as a signal source, e.g., camera, Hard Drive (HD), external memory device, etc.

In different applications, some of the components shown in FIG. 7 can be omitted. The whole system shown in FIG. 7 is controlled by computer readable instructions, which are generally stored in the media 707. The software can be downloaded from a network (not shown in the figures), stored in the media 707. Alternatively, software downloaded from a network can be loaded into the memory 702 and executed by the processor 701 so as to complete the function determined by the software.

The processor 701 may be configured to perform one or more methodologies described in the present disclosure, illustrative embodiments of which are shown in the above figures and described herein. Embodiments of the present invention can be implemented as a routine that is stored in memory 702 and executed by the processor 701 to process the signal from the media 707. As such, the computer system is a general-purpose computer system that becomes a specific purpose computer system when executing routines of the present disclosure.

Although the computer system described in FIG. 7 can support methods according to the present disclosure, this system is only one example of a computer system. Those skilled of the art should understand that other computer system designs can be used to implement embodiments of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although illustrative embodiments of the present invention have been described herein with reference to the accompanying drawings, it is to be understood that the invention is not limited to those precise embodiments, and that various other changes and modifications may be made therein by one skilled in the art without departing from the scope of the appended claims.

What is claimed is:

1. A method for determining a generation schedule with contingency constraints for controlling power output levels for a plurality of generators in an electric power system comprising:
   determining a measure of a sparse, corrective model, security-constrained optimal power flow (C-SCOPF) using a penalty term which reduces a number of post-contingency rescheduling operations for each of a plurality of contingencies and reduces an amount of total power rescheduled for each of the plurality of contingencies;
   wherein the penalty term is defined $\Sigma_{c \in C} \|p^c - p^0\|_1$ where C is a contingency index set which includes the plurality of contingencies, $P^c$ is a post-contingency power generation level for a corresponding contingency c, $P^0$ is a power generation level for a normal state of the electric power system; and
   adjusting a power output level of at least one of the plurality of generators according to the measure of the sparse C-SCOPF upon detecting a contingency in the electric power system.

2. The method of claim 1, number of post-contingency rescheduling operations for each of the plurality of contingencies is determined according to a ramping capability of at least one of the plurality of generators.

3. The method of claim 1, further comprising decomposing the determination of the measure of the sparse C-SCOPF into a master problem and a plurality of sub-problems, each of the plurality of sub-problems corresponding to one of the plurality of contingencies.

4. The method of claim 3, wherein each of the plurality of sub-problems is independent, the method further comprising solving the plurality of sub-problems by distributed and parallel computation.

5. The method of claim 3, further comprising an acceleration of a convergence rate of the decomposition.

6. The method of claim 3, where the power output is a direct current output.

7. The method of claim 3, where the power output is an alternating current output.

8. A non-transitory computer readable storage medium for determining power output levels with contingency constraints for a plurality of generators in an electric power system, the non-transitory computer readable storage medium having program instructions embodied therewith, the program instructions executable by a processor to cause the processor to perform a method comprising:
   determining a measure of a sparse, corrective model, security-constrained optimal power flow (C-SCOPF) using a penalty term which reduces a number of post-contingency rescheduling operations for each of a plurality of contingencies and reduces an amount of total power rescheduled for each of the plurality of contingencies;
   wherein the penalty term is defined $\Sigma_{c \in C} \|p^c - p^0\|_1$ where C is a contingency index set, which includes the plurality of contingencies, $P^c$ is a post-contingency power generation level for a corresponding contingency c, $P^0$ is a power generation level for a normal state of the electric power system; and
   adjusting a power output level of at least one of the plurality of generators according to the measure of the sparse C-SCOPF upon detecting a contingency in the electric power system.

9. The non-transitory computer readable storage medium of claim 8, number of post-contingency rescheduling operations for each of the plurality of contingencies is determined according to a ramping capability of at least one of the plurality of generators.

10. The non-transitory computer readable storage medium of claim 8, further comprising decomposing the determination of the measure of the sparse C-SCOPF into a master problem and a plurality of sub-problems, each of the plurality of sub-problems corresponding to one of the plurality of contingencies.

11. The non-transitory computer readable storage medium of claim 10, wherein each of the plurality of sub-problems is independent, the method further comprising solving the plurality of sub-problems by distributed and parallel computation.

12. The non-transitory computer readable storage medium of claim 10, further comprising an acceleration of a convergence rate of the decomposition.

13. The non-transitory computer readable storage medium of claim 10, where the power output is one of a direct current output and an alternating current output.

14. An apparatus configured to determine power output levels with contingency constraints for a plurality of generators in an electric power system comprising:
   a non-transitory computer readable storage medium having program instructions embodied therewith, the program instructions executable by a processor of the apparatus to cause the apparatus to:
   determining a measure of a sparse, corrective model, security-constrained optimal power flow (C-SCOPF) using a penalty term which reduces a number of post-contingency rescheduling operations for each of a plurality of contingencies and reduces an amount of total power rescheduled for each of the plurality of contingencies;
   wherein the penalty term is defined $\Sigma_{c \in C} \|p^c - p^0\|_1$ where C is a contingency index set, which includes the plurality of contingencies, $P^c$ is a post-contingency power generation level for a corresponding contingency c, $P^0$ is a power generation level for a normal state of the electric power system; and
   adjusting a power output level of at least one of the plurality of generators according to the measure of the sparse C-SCOPF upon detecting a contingency in the electric power system.

15. The apparatus of claim 14, wherein a number of post-contingency rescheduling operations for each of the plurality of contingencies is determined according to a ramping capability of at least one of the plurality of generators.

16. The apparatus of claim 14, wherein the system operator decomposes the determination of the measure of the sparse C-SCOPF into a master problem and a plurality of sub-problems, each of the plurality of sub-problems corresponding to one of the plurality of contingencies.

17. The apparatus of claim 16, wherein each of the plurality of sub-problems is independent, the apparatus solving the plurality of sub-problems by distributed and parallel computation.

18. The apparatus of claim 16, wherein the apparatus is configured to accelerate a convergence rate of the decomposition.

19. The apparatus of claim 14, wherein the at least one of the plurality of generators outputs one of a direct current output and an alternating current output.

* * * * *